Aug. 10, 1948.    D. L. SHAPIRO    2,446,613
PULSE SLOPE-AMPLITUDE RELATION RESTORING SYSTEM
Filed Feb. 7, 1946
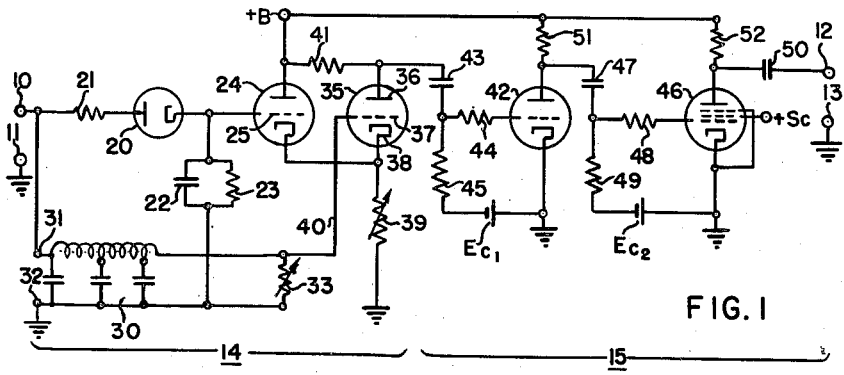
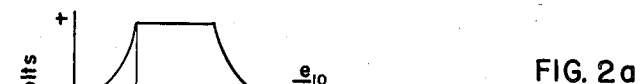
FIG. 2a
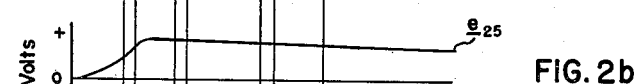
FIG. 2b
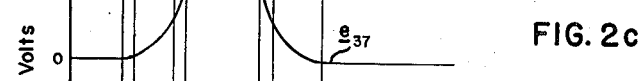
FIG. 2c
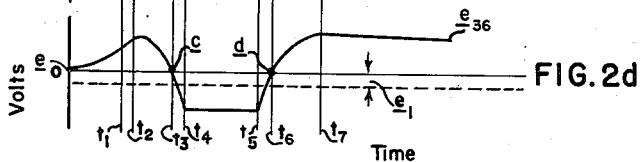
FIG. 2d
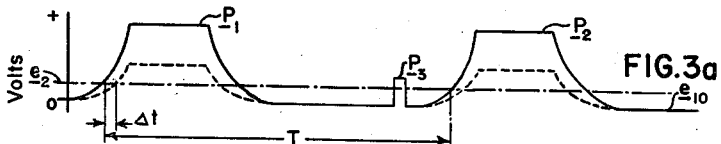
FIG. 3a
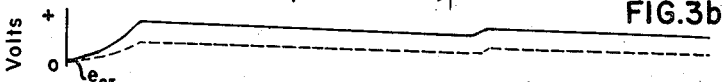
FIG. 3b
FIG. 3c
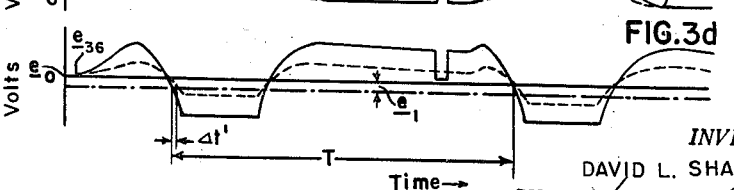
FIG. 3d
*INVENTOR:*
DAVID L. SHAPIRO,
BY
*ATTORNEY.*

Patented Aug. 10, 1948

2,446,613

UNITED STATES PATENT OFFICE 2,446,613

PULSE SLOPE-AMPLITUDE RELATION RESTORING SYSTEM

David L. Shapiro, Kew Gardens, N. Y., assignor, by mesne assignments, to Hazeltine Research, Inc., Chicago, Ill., a corporation of Illinois Application February 7, 1946, Serial No. 646,057

10 Claims. (Cl. 178—44)

1

This invention is directed to an arrangement for translating an applied signal pulse having at least one sloping edge that varies between maximum and minimum amplitude values. While the invention may be utilized in a variety of installations, it is especially suited for use in a direction-finder system receiving signal pulses with exponentially shaped edges and will be particularly described in that connection.

Direction-finder systems in which bearing and ranging information are determined through the use of pulse-modulated signals have been proposed and are well known. One system includes a transmitter for sending out time-spaced pulses and a receiver for intercepting reflections of the transmitted pulses, occasioned when such pulses encounter a reflecting object concerning which direction-finding data is desired. The distance of the reflecting object, for example, may be ascertained by calculating the total time elapsed during the travel of a single pulse from the transmitter to the reflector and back to the receiver. In operating the system, the oscillation generator of the transmitter is frequently maintained in a non-oscillatory condition but is controlled by a pulse-modulated excitation potential to generate time-spaced pulses for transmission. Where this mode of operation is employed, the oscillations generated during any modulating interval build up approximately in an exponential manner from zero or a minimum value to a maximum value early in the period of the applied pulse of the modulating potential. They maintain this maximum value for the remainder of the modulating interval and thereafter decay exponentially to zero. Consequently, both the leading and trailing edges of the transmitted pulses are exponential in waveform. The reflected pulses picked up by the receiver are applied to a ranging device which provides the desired information.

Usually, the ranging device responds when the received pulse has attained a preselected amplitude level. This introduces a possible error in the direction-finding data because signals having sloping edges reach any fixed amplitude level at a time that varies with, and is determined by, the peak value of the pulse. Hence, changes in atmospheric conditions which alter the attenuation characteristics of the signal propagation path may cause such prior systems to produce inaccurate information.

In other direction-finder systems a pair of pulses are transmitted from one point or station to another, the desired information being represented by the time separation of the paired

2 pulses. The receiver in this system oftentimes includes a peak detector so that through the process of peak detection the leading edges of the paired pulses may be derived to the exclusion of spurious signals of low amplitude that may intervene between the received pulses. However, it is found that such a process has a tendency to increase the apparent time separation of the paired pulses which is undesired in many installations.

It is an object of the present invention, therefore, to provide an arrangement for translating signal pulses and which substantially avoids one or more of the aforementioned limitations of prior arrangements.

It is another object of the invention to provide an improved arrangement for translating applied signal pulses having exponentially sloped edges to derive therefrom output pulses which attain a preselected amplitude level at approximately the same time regardless of variations in the peak amplitude of the applied pulses.

It is another object of the invention to provide an improved arrangement for translating applied signal pulses and for effectively suppressing spurious signals which may accompany the applied pulses.

In accordance with the invention, an arrangement for translating an applied signal pulse having a sloping edge that varies between maximum and minimum amplitude values comprises a first channel for translating the applied pulse. This channel includes means for deriving from the applied pulse a first signal having a substantial amplitude for an interval at least equal to the duration of the sloping edge of the applied pulse and including a portion having a substantially constant amplitude determined by the maximum amplitude of the sloping edge of the applied pulse. The arrangement also comprises a second channel for translating the applied pulse while preserving the sloping edge thereof to provide a second pulse occurring in such time relation that a portion of its sloping edge, extending from the point of maximum amplitude to a point of a preselected fraction of the maximum amplitude, occurs within the duration of the constant-amplitude portion of the first derived signal. Means are provided for effectively combining the first derived signal and the second pulse with opposite polarities and with such relative amplitudes that the constant-amplitude portion of the first derived signal has a value equal to the aforesaid fraction of the maximum amplitude of the sloping edge of the second pulse to produce an output pulse signal of a given polarity. The output pulse thus produced has a sloping edge representing the sloping edge of the applied pulse and intercepting a reference axis at a substantially fixed point in time regardless of variations in the maximum amplitude value of the sloping edge of the applied pulse.

For a better understanding of the present invention, together with other and further objects thereof, reference is had to the following description taken in connection with the accompanying drawing, and its scope will be pointed out in the appended claims.

In the drawing, Fig. 1 is a schematic representation of a pulse-translating arrangement embodying the present invention; Figs. 2a–2d, inclusive, comprise curves utilized in explaining the operation of the Fig. 1 arrangement in translating an applied pulse; while Figs. 3a–3d, inclusive, comprise curves to be used in discussing the response of the Fig. 1 arrangement to paired pulses.

Referring now more particularly to Fig. 1 there is represented a pulse-translating arrangement, in accordance with the present invention, which may be considered as a portion of the receiving system of a direction finder of the type discussed above. Inasmuch as a complete understanding of the invention may be obtained from a consideration of the schematic diagram of Fig. 1, the remaining portions of the direction finder, which may have any conventional design and construction, have been omitted for purposes of simplification. It will be understood, however, that this system is intended to translate signal pulses having at least one sloping edge, either the leading or trailing edge, that varies exponentially between maximum and minimum amplitude values. Such a signal is represented by the curve of Fig. 2a and will be described more particularly in discussing the operation of the illustrated embodiment.

The arrangement of Fig. 1 has input terminals 10 and 11 to which signal pulses may be applied from a preceding stage of the receiver as, for example, the wave-signal detector. It also has output terminals 12 and 13 for supplying output pulses to a utilizing device which may constitute the ranging apparatus (not shown) of the direction-finder system. Intermediate the input and output terminals there are a pulse-translating arrangement 14 and an amplitude-limiting system 15 which co-operate to supply desired output pulses to output terminals 12, 13 in response to pulses presented to input terminals 10, 11. To facilitate a detailed discussion of units 14 and 15, it will be assumed that the applied pulses have a leading edge of exponential wave form and that the utilizing device, intended to utilize the output pulses available at terminals 12 and 13, is responsive to the leading edge of such pulses.

The arrangement of unit 14 comprises a first channel for translating applied pulses. This channel includes means for deriving from an applied pulse a first signal having a substantial amplitude for an interval at least equal to the duration of the leading edge of the applied pulse and including a portion having a substantially constant amplitude determined by the maximum amplitude of the leading edge of the applied pulse. More specifically, the first channel is provided by a diode rectifier 20, the anode electrode of which is coupled to input terminal 10 through a resistor 21. An integrating load circuit, comprising the parallel combination of a condenser 22 and a resistor 23, has one terminal directly connected with the cathode of diode 20 and an opposite terminal which is grounded, thereby to complete a circuit across input terminals 10, 11 including rectifier 20. This circuit constitutes means for integrating applied signal pulses to develop a first signal in the resistor-condenser combination of elements 22, 23. Preferably, the integrating circuit has a charging time constant which is short in comparison with the duration of the applied pulses but a discharging time constant that is long with reference to the pulse duration.

Unit 14 also comprises a second channel for translating applied pulses while preserving, in the case under consideration, the wave form of their leading edges to provide a second pulse. The second channel is selected to cause this second pulse to occur in such time relation that a portion of its leading edge, extending from the point of maximum amplitude to a point of a preselected fraction of its maximum amplitude, occurs within the duration of the constant-amplitude portion of the first signal developed by elements 22, 23 of the first-described channel. This time relationship will be made clear hereinafter in connection with the curves of Figs. 2b and 2c. For the illustrated embodiment in which the leading edges of the applied pulses are to control the utilizing device, this second channel comprises a time-delay network 30 for delaying the applied pulses. Ideally, time-delay network 30 is a distortionless transmission line, but an artificial line or equivalent wave filter may be used for practical applications. An artificial line is illustrated in the drawing, having series-connected inductors shown as a single continuous inductor and intermediate shunt-connected condensers. The line has input terminals 31 and 32 which are coupled across terminals 10, 11 and its far end is terminated in an adjustable resistive impedance 33 which, preferably, terminates the line in its characteristic impedance.

An output signal is obtained from unit 14 through means for effectively combining the signal outputs of the first and second channels with opposite polarities and with relative amplitudes defined more particularly hereinafter. This combining means comprises a wave-signal repeater including a vacuum tube 35 having an anode 36, a control electrode 37, and a cathode 38. The signal output of the first-mentioned channel, including diode 20, is applied to the input circuit of repeater 35 through a cathode-loaded triode 24, having a control electrode 25 connected with the high-potential terminal of integrating circuit 22, 23 and having a cathode load 39 in common with repeater 35. The signal output of the second channel, including time-delay network 30, is applied to repeater 35 through a connection 40, extending from the control electrode 37 of the repeater to the terminating impedance 33 of the delay network. The anode electrode of the repeater is connected with a space current source +B through a resistor 41. Its output circuit is coupled to a second repeater included in unit 15. This repeater is provided by the vacuum tube 42 and the coupling is through condenser 43 and resistors 44 and 45. The output circuit of repeater 42, in turn, is connected with an amplitude-limiting stage comprising a pentode-type tube 46. The coupling between tubes 42 and 46 includes a condenser 47 and resistors 48 and 49. A condenser 50 couples the output circuit of limiter 46 to output terminals 12, 13 of the pulse-translating arrangement. Resistors 51 and 52 connect tubes 42 and 46, respectively, to the space current source +B. Bias potential sources $E_{c_1}$ and $E_{c_2}$ furnish suitable bias potentials for these tubes.

The response of the described arrangement to a single applied pulse is shown by the curves of Figs. 2a–2d, inclusive, where the subscript associated with any curve designates the circuit point at which the signal represented thereby is obtained. The pulse $e_{10}$ applied to the input terminals 10, 11 has a flat or constant amplitude-peak portion and sloping edges that vary exponentially from this maximum value to zero. The integration of the applied pulse in the first channel, including diode 20, establishes across elements 22 and 23 and applies to cathode 38 of repeater 35 the signal $e_{25}$. In view of the described charging and discharging time constants of the integrating circuit, this signal $e_{25}$ has a steeply sloped leading portion and a contiguous gradually sloped, or approximately flat trailing portion. The amplitude of the trailing portion is determined by the peak or maximum amplitude of the applied pulse and is substantially constant for intervals of the order of the pulse duration.

The translation of the applied pulse through the second channel, including time-delay network 30, provides at the control electrode of repeater 35 the delayed pulse $e_{37}$, having a time delay $t_2$—$t_4$ with reference to the applied pulse. Network 30 is selected to introduce such a delay that the leading edge of pulse $e_{37}$ occurs during the time $t_1$—$t_4$ when the first signal $e_{25}$ has a substantial amplitude. Preferably, the delay of network 30 causes the maximum amplitude point and the half-maximum amplitude point of the leading edge of delayed pulse $e_{37}$ to occur within the duration of the flat or constant-amplitude portion of the first signal $e_{25}$. The maximum amplitude and half-maximum amplitude points of the leading edge of pulse $e_{37}$ are indicated by ordinate lines $t_4$ and $t_3$, respectively.

Since the first signal $e_{25}$ is applied to the cathode and the delayed pulse $e_{37}$ is applied to the control electrode of repeater 35 with the polarities indicated, these signals are effectively combined with opposite polarities in the input circuit of the repeater. The parameters of the first and second channels are adjusted so that the constant-amplitude portion of signal $e_{25}$ during the time interval $t_3$—$t_4$ has an amplitude value equal to half the maximum amplitude of the leading edge of delayed pulse $e_{37}$.

The signals applied to the input circuit of repeater 35 cause potential variations at its anode. These potential variations produce the signal $e_{36}$. The signal $e_{36}$ includes a pulse component of given polarity occurring in the time interval $t_3$—$t_6$. This pulse component has a leading edge, included between ordinate lines $t_3$ and $t_4$, which is an approximate replica of the leading edge of the applied pulse $e_{10}$. It intersects a reference axis $e_0$ at a point designated $c$. The reference axis $e_0$ is the anode potential of the repeater in the absence of signals in its input circuit. The intersection $c$ is fixed in time regardless of the maximum amplitude of the applied pulse $e_{10}$ since the amplitude values of signals $e_{37}$ and $e_{25}$ at the time $t_3$ are equal and remain equal irrespective of variations in the maximum amplitude of the applied pulse.

The signal $e_{36}$ is translated by repeater 42 and applied with a polarity reversal to the input circuit of amplitude limiter 46. The bias source $E_{c_2}$ is adjusted so that the limiter passes only the pulse component of signal $e_{36}$, that is, the signal portion within the ordinates $t_3$ and $t_6$. This pulse component has one polarity and is the output pulse supplied to terminals 12, 13 for utilization by the utilizing device in response to the applied pulse $e_{10}$ presented to input terminals 10, 11. The utilizing circuit may be amplitude selective and may respond when the output pulse has an amplitude value designated $e_1$.

In the foregoing discussion it has been stated that in the interval $t_1$—$t_4$, corresponding to the leading edge of delayed pulse $e_{37}$, the first signal $e_{25}$ has "substantial" amplitude and includes a portion of approximately constant amplitude. The constant-amplitude portion of this signal during the interval $t_3$—$t_4$ has been discussed. It determines the leading edge of the pulse component of signal $e_{36}$ and its intersection $c$ with the reference axis $e_0$. For the rest of the interval $t_1$—$t_4$, namely, during the time $t_1$—$t_3$, the instantaneous amplitude value of the signal $e_{25}$ is preferably greater, but at any rate not appreciably less, than the instantanous amplitude level of delayed pulse $e_{37}$. Where this operating criterion is satisfied, the signal $e_{36}$ first crosses the reference axis $e_0$ at the intersection $c$ and the output pulse produced at terminals 12, 13 has a clean leading edge.

It will be apparent from the wave forms of Figs. 2a and 2d that the output pulse produced, corresponding to the portion of signal $e_{36}$ within the interval $t_3$—$t_6$, has approximately the same wave form as the applied pulse $e_{10}$ so long as the integrating circuit of the first-described channel has a discharge time constant long with reference to the duration of the applied pulse. In other words, for this condition, the arrangement is able to translate an applied pulse while still preserving its wave form and this is a highly desirable feature for many applications.

The trailing edge of the delayed pulse $e_{37}$ occurs during the time interval $t_5$—$t_7$ and has its half-maximum amplitude at the time $t_6$. For the duration of this trailing edge, the first signal $e_{25}$ has a substantially constant amplitude value approximately equal to one-half the maximum amplitude of the delayed pulse. Therefore, the trailing edge of the output pulse supplied to terminals 12, 13 intersects the reference axis $e_0$ at a fixed time $d$ regardless of variations in the peak amplitude of the applied pulse. Thus the arrangement of Fig. 1, as described, will be seen to be very flexible. It is suited to supply pulse signals to a utilizing device designed to utilize the leading and/or trailing edges of received pulses.

Where the utilizing device is to respond only to the trailing edge of the output pulse obtained at terminals 12, 13, the wave form of the leading edge of the output pulse is not critical. In such a case, it is not necessary to delay the applied signal in translation through the second channel. This will be apparent by projecting curve $e_{10}$ upon curve $e_{25}$ from which it becomes evident that substantially the entire trailing edge of the applied pulse occurs within the duration of the flat portion of signal $e_{25}$. Where the arrangement of Fig. 1 is to be operated in this manner, network 30 included in the second channel may have a negligible delay. That is to say, the second channel may comprise merely a parallel path for applying the input signal to the control electrode 37 of repeater 35 in phase opposition to, and with proper amplitude relative to, the signal applied to the cathode 38 from the first channel, including diode 20.

It has been convenient, in discussing and in representing the operation of the invention, to refer to the preferred arrangement in which the constant-amplitude portion of signal $e_{25}$ has a value of one-half the maximum amplitude of one sloping edge of the applied pulse. However, the arrangement is not limited to this particular adjustment. It may be shown that signals of exponential wave form attain the same fractional portion of their maximum amplitude in the same time interval. Therefore, the intersections $c$ and $d$ may, if desired, occur when the sloping edges of the pulse provided by the second signal channel or path attain any desired fractional value of their maximum amplitude. It is only necessary that the flat portion of signal $e_{25}$ have a corresponding amplitude value, equal to the selected fractional portion of the maximum amplitude of the sloping edge of the delayed pulse.

The curves of Figs. 3a–3d, inclusive, are similar to those of Figs. 2a–2d, inclusive, and depict the operation in response to paired pulses $p_1$ and $p_2$ applied to input terminals 10, 11. The full-line curves indicate the response for applied pulses having one maximum amplitude, while the broken-line curves show the response for like pulses of only half that maximum amplitude. In Fig. 3a, the time interval $\Delta t$ represents the time delay for the pulses of small amplitude to reach a desired firing level $e_2$. The resulting output pulses obtained at terminals 12, 13 reach a corresponding firing level $e_1$ with the delay $\Delta t'$ of Fig. 3d. It is apparent that the described arrangement minimizes the effect of variations in peak amplitude on the time required for a received pulse to attain a desired amplitude level. Additionally, the output pulses supplied to terminals 12, 13 have a time separation T which is identical with that of the applied pair of pulses.

The curves under consideration also demontrate the effect of the arrangement in suppressing spurious signals which may accompany either one of the paired pulses. In Fig. 3a, for example, a spurious pulse $p_3$ is represented as occurring between the paired pulses $p_1$ and $p_2$ with an amplitude sufficiently large to exceed the level $e_2$. Referring now to Fig. 3d, it is clear that the spurious pulse does not project beyond the reference axis $e_0$ and, therefore, is not translated to the output terminals 12, 13. For this reason, signal translation may be carried on without interference from spurious pulses of appreciable magnitude, providing the relative magnitude of the spurious pulse does not exceed that of signal $e_{25}$. The suppression of spurious signals which may precede pulse $p_1$ may also be accomplished. For this purpose, the delay of network 30 is increased to cause the undesired signal, as obtained from the delay network, to fall within the flat portion of signal $e_{25}$.

The discharge time constant of the intergrating circuit in Fig. 1 is determined entirely by the values of condenser 22 and resistor 23. It is preferably made very large compared to the pulse duration so that pulses applied to input terminals 10, 11 are translated to output terminals 12, 13 with a minimum of distortion. Usually a value is employed which gives the greatest discharge time constant while still permitting the arrangement to translate succeeding pulses having maximum amplitudes which differ by the largest amount contemplated in the operation of the system. This selection of the discharge time constant will be apparent when it is realized that the signal developed by elements 22, 23 serves as an amplitude delay bias for diode 20. Accordingly, the discharge of condenser 22, following the integration of one applied pulse, must be fast enough to reduce the bias of diode 20 to permit peak rectification of the next succeeding pulse. When the discharge time constant is thus proportioned, each applied pulse is integrated and translated in the manner represented by the curves of Figs. 2a–2d, inclusive.

On embodiment of the invention found to have practical utility included the following:

Unit 14
Tube 20 _____ Type 6AL5
Tubes 24 and 25___ Type 6J6
Resistor 21_____ 2,200 ohms
Resistor 23_____ 47,000 ohms
Resistor 33_____ 3,300 ohms
Resistor 39_____ 1,000 ohms
Resistor 41_____ 0.1 megohm
Condenser 22 _____ 50 micromicrofarads
Delay of time-delay
network 30_____ At least equal to the duration of the leading edge of applied pulse
Characteristic impedance of timedelay network 30 _____ 3,300 ohms Unit 15
Tube 42 _____ Type 6J6
Tube 46 _____ Type 6AK5
Resistors 44 and 48 _____ 22,000 ohms
Resistors 45 and 49 _____ 10,000 ohms
Resistor 51 _____ 4,700 ohms
Resistor 52 _____ 0.1 megohm
Condenser 43 _____ 0.1 microfarad
Condenser 47 _____ 0.005 microfarad
Condenser 50 _____ 0.01 microfarad Operating conditions of units 14 and 15
Voltage Source
+B _____ 136 volts
Bias Source $E_{c1}$ ___ Zero volts
Bias Source $E_{c2}$ ___ (−) 10 volts The arrangement of this invention in its preferred form may be viewed as one which produces a bowl (curve $e_{25}$) and inserts the desired pulse into the bowl so that only the top part of the pulse projects over the bowl (the portion of curve $e_{26}$ between points $c$ and $d$). The points $c$ and $d$ at which the pulse intersects the rim of the bowl are fixed irrespective of variations in peak amplitude or variations in duty cycle. Among its other advantages, the arrangement suppresses any unwanted or interfering signals of insufficient amplitude to climb out of the bowl, whether the signals come before or after the desired pulse. When the invention is employed primarily to achieve this latter result, it is not at all essential that the applied pulses have edges of exponential wave form.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. An arrangement for translating an applied signal pulse having a sloping edge that varies between maximum and minimum amplitude values comprising, a first channel for translating said applied pulse including means for deriving therefrom a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of its sloping edge extending from the point of maximum amplitude to a point of a preselected fraction of said maximum amplitude occurs within the duration of said constant-amplitude portion of said first signal, and means for effectively combining said first signal and said second pulse with opposite polarities and with such relative amplitudes that said constant-amplitude portion of said first signal has a value equal to said fraction of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

2. An arrangement for translating an applied signal pulse having a sloping edge that varies between maximum and minimum amplitude values comprising, a first channel for translating said applied pulse including means for deriving therefrom a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of its sloping edge extending from the point of maximum amplitude to a point of one-half maximum amplitude occurs within the duration of said constant-amplitude portion of said first signal, and means for effectively combining said first signal and said second pulse with opposite polarities and with such relative amplitudes that said constant-amplitude portion of said first signal has a value equal to one-half of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

3. An arrangement for translating an applied signal pulse having a sloping edge that varies between maximum and minimum amplitude values comprising, a first channel for translating said applied pulse including means for deriving therefrom a first signal having a substantial amplitude for an interval long with respect to the duration of said applied pulse and including a portion having for at least the duration of said applied pulse a substantially constant amplitude determined by said maximum amplitude of said sloping edge, a second channel for translating said applied pulse comprising means for delaying said applied pulse so that substantially all of the delayed pulse including a portion of said sloping edge extending from the point of maximum amplitude to a point of a preselected fraction of said maximum amplitude occurs within the duration of said constant-amplitude portion of said first signal, and means for effectively combining said first signal and said delayed pulse with opposite polarities and with such relative amplitudes that said constant-amplitude portion of said first signal has a value equal to said fraction of the maximum amplitude of said sloping edge of said delayed pulse to produce an output pulse signal of a given polarity having approximately the same wave form as said applied pulse and a corresponding sloping edge that intersects a reference axis at a substantially fixed point in time regardless of variations in the maximum amplitude of said sloping edge of said applied pulse.

4. An arrangement for translating an applied signal pulse having a sloping edge that varies between maximum and minimum amplitude values comprising, a first channel for translating said applied pulse including integrating means for deriving therefrom a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of its sloping edge extending from the point of maximum amplitude to a point of a preselected fraction of said maximum amplitude occurs within the duration of said constant-amplitude portion of said first signal, and means for effectively combining said first signal and said second pulse with opposite polarities and with such relative amplitudes that said constant-amplitude portion of said first signal has a value equal to said fraction of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

5. An arrangement for translating an applied signal pulse having a sloping edge that varies between maximum and minimum amplitude values comprising, a first channel for translating said applied pulse including integrating means having charging and discharging time constants which are short and long, respectively, with reference to the duration of said applied pulse for deriving therefrom a first signal including a steeply sloped leading portion and a gradually sloped trailing portion which has for intervals equal to the duration of said applied pulse an approximately constant amplitude determined by the maximum amplitude of said sloping edge of said applied pulse, a second channel for translating said applied pulse while preserving said sloping edge thereof to provide a second pulse occurring in such time relation that a portion of said sloping edge extending from the point of maximum amplitude to a point of a preselected fraction of said maximum amplitude occurs within the duration of said gradually sloped portion of said first signal, and means for effectively combining said first signal and said second pulse with opposite polarities and with such relative amplitudes that said gradually sloped portion of said first signal has a value equal to said fraction of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

6. An arrangement for translating an applied signal pulse having a sloping edge that varies between maximum and minimum amplitude values comprising, a first channel for translating said applied pulse including a diode rectifier having an integrating load circuit for deriving from said applied pulse a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of its sloping edge extending from the point of maximum amplitude to a point of a preselected fraction of said maximum amplitude occurs within the duration of said constant-amplitude portion of said first signal, and means for effectively combining said first signal and said second pulse with opposite polarities and with such relative amplitudes that said constant-amplitude portion of said first signal has a value equal to said fraction of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

7. An arrangement for translating an applied signal pulse having a sloping edge that varies between maximum and minimum amplitude values comprising, a first channel for translating said applied pulse including means for deriving therefrom a first signal having a substantial amplitude for an interval at least equal to the duration of said sloping edge and including a portion having a substantially constant amplitude determined by said maximum amplitude of said sloping edge, a second channel for translating said applied pulse comprising a time-delay network terminated at one end in its characteristic impedance and effective to delay said applied pulse so that a portion of said sloping edge extending from the point of maximum amplitude to a point of a preselected fraction of said maximum amplitude occurs within the duration of said constant-amplitude portion of said first signal, and means for effectively combining said first signal and said delayed pulse with opposite polarities and with such relative amplitudes that said constant-amplitude portion of said first signal has a value equal to said fraction of the maximum amplitude of said sloping edge of said delayed pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse.

8. An arrangement for translating an applied signal pulse having a sloping edge that varies between maximum and minimum amplitude values comprising, a first channel for translating said applied pulse including means for deriving therefrom a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of its sloping edge extending from the point of maximum amplitude to a point of a preselected fraction of said maximum amplitude occurs within the duration of said constant-amplitude portion of said first signal, a vacuum-tube wave-signal repeater having input and output circuits, means for applying said first signal and said second pulse to said input circuit with opposite polarities and with such relative amplitudes that said constant-amplitude portion of said first signal has a value equal to said fraction of the maximum amplitude of said sloping edge of said second pulse to produce in said output circuit an output pulse signal of a given polarity having a sloping edge representing said sloping edge of said applied pulse and intersecting a reference axis at a substantially fixed point in time regardless of variations in the maximum amplitude of said sloping edge of said applied pulse.

9. An arrangement for translating an applied signal pulse having a sloping edge that varies between maximum and minimum amplitude values comprising, a first channel for translating said applied pulse including means for deriving therefrom a first signal having a substantial amplitude for an interval at least equal to the duration of said sloping edge and including a portion having a substantially constant amplitude determined by said maximum amplitude of said sloping edge, a second channel for translating said applied pulse while preserving said sloping edge thereof to provide a second pulse occurring in such time relation that a portion of said sloping edge extending from the point of maximum amplitude to a point of a preselected fraction of said maximum amplitude occurs within the duration of said constant-amplitude portion of said first signal, means for effectively combining said first signal and said second pulse with opposite polarities and with such relative amplitudes that said constant-amplitude portion of said first signal has a value equal to said fraction of the maximum amplitude of said sloping edge of said second pulse to produce an output pulse signal of a given polarity having a sloping edge representing said sloping edge of said applied pulse and intersecting a reference axis at a substantially fixed point in time regardless of variations in the maximum amplitude of said sloping edge of said applied pulse, and means for applying said output pulse to a utilizing device.

10. An arrangement for translating an applied signal pulse having a leading edge that varies between maximum and minimum amplitude values comprising, a first channel for translating said applied pulse including means for deriving therefrom a first signal having a substantial amplitude for an interval at least equal to the duration of said leading edge and including a portion having a substantially constant amplitude determined by said maximum amplitude of said leading edge, a second channel for translating said applied pulse comprising means for delaying said applied pulse so that a portion of said leading edge extending from the point of maximum amplitude to a point of a preselected fraction of said maximum amplitude occurs within the duration of said constant-amplitude portion of said first signal, and means for effectively combining said first signal and said delayed pulse with opposite polarities and with such relative amplitudes that said constant-amplitude portion of said first signal has a value equal to said fraction of the maximum amplitude of said leading edge of said delayed pulse to produce an output pulse signal of a given polarity having a leading edge representing said leading edge of said applied pulse and intersecting a reference axis at a substantially fixed point in time regardless of variations in the maximum amplitude of said leading edge of said applied pulse.

DAVID L. SHAPIRO.